UNITED STATES PATENT OFFICE.

EDWARD H. BARRETT, OF MINNEAPOLIS, MINNESOTA.

IMPROVEMENT IN COMPOUNDS FOR ARTIFICIAL STONE.

Specification forming part of Letters Patent No. 205,824, dated July 9, 1878; application filed June 17, 1878.

*To all whom it may concern:*

Be it known that I, EDWARD H. BARRETT, of Minneapolis, in the county of Hennepin and State of Minnesota, have invented an Improved Compound for Artificial Stone; and I hereby declare the following to be a full, clear, and exact description thereof.

My present invention consists in an artificial stone formed of certain ingredients chemically treated and combined in a peculiar manner, to produce a hard crystallized substance which is impervious to water, and will withstand the action of frost, thereby particularly adapting it for use as a building material in any climate.

To enable others skilled in the art to understand and use my invention, I will proceed to describe the manner in which I have carried it out.

I take one gallon of vinegar, two ounces of iodine dissolved in alcohol, one pound of caoutchouc or india-rubber dissolved in ether, three pounds of tannic acid dissolved in water, three pounds of carbonate of ammonia dissolved in water, one pound of carbonate of potash dissolved in water, one pound of gum-arabic dissolved in water, and place all these ingredients in a suitable vessel with thirty gallons of water, and thoroughly incorporate them together by stirring. I then mix, while dry, one part, more or less, of cement, and six parts, more or less, of clean sharp sand or gravel. After this I dilute one gallon of the last-mentioned liquid compound (composed of the several ingredients specified) with thirty gallons of water, and thoroughly stir them together, and then dampen this said mixture of cement and sand or gravel with a sufficient quantity of the said last-mentioned diluted mixture, after which the whole is tamped in the ordinary manner.

The render the stone impervious to water, I take one gallon of the diluted solution previously referred to, and add one pound of carbonate of ammonia, and apply the same to the outside of the stone by means of a brush, which rapidly hardens its surface and renders it possible to use the stone before it becomes perfectly crystallized.

An artificial stone produced as above described possesses great durability and superior hardness, and as the ingredients of which it is composed are compactly united in a solid mass and crystallized by the action of the chemical solutions referred to, the stone will become, when dry, impervious to water, thereby preventing the entrance of moisture, and the consequent injury or destruction of the stone by frost when exposed to low temperatures.

What I claim as my invention, and desire to secure by Letters Patent, is—

1. The herein-described chemical compound, consisting of vinegar, iodine dissolved in alcohol, caoutchouc dissolved in ether, tannic acid, carbonate of ammonia, carbonate of potash, and gum-arabic dissolved in water, substantially in the proportions above named, and diluted, as set forth, for the purpose of producing the crystallization of the artificial stone, as described.

2. An artificial stone composed of cement and sand or gravel moistened with the diluted chemical mixture or compound formed of the ingredients described, substantially as and for the purpose set forth.

Witness my hand this 10th day of June, 1878.

EDWARD H. BARRETT.

In presence of—
 JOHN D. MCCLURE,
 ROBERT KENNEDY.